United States Patent
Nakamura

(10) Patent No.: US 8,875,755 B2
(45) Date of Patent: Nov. 4, 2014

(54) PNEUMATIC TIRE FOR MOTORCYCLE

(75) Inventor: Ichizou Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 991 days.

(21) Appl. No.: 12/918,242

(22) PCT Filed: Feb. 19, 2009

(86) PCT No.: PCT/JP2009/052871
§ 371 (c)(1),
(2), (4) Date: Oct. 18, 2010

(87) PCT Pub. No.: WO2009/104672
PCT Pub. Date: Aug. 27, 2009

(65) Prior Publication Data
US 2011/0024009 A1    Feb. 3, 2011

(30) Foreign Application Priority Data
Feb. 19, 2008  (JP) ................ 2008-037616

(51) Int. Cl.
*B60C 11/11* (2006.01)
*B60C 11/03* (2006.01)
*B60C 11/13* (2006.01)

(52) U.S. Cl.
CPC ........... *B60C 11/11* (2013.01); *B60C 2200/10* (2013.01); *B60C 11/032* (2013.01); *B60C 11/1392* (2013.01); *B60C 11/13* (2013.01); *B60C 2200/14* (2013.01); *Y10S 152/902* (2013.01); *Y10S 152/03* (2013.01)
USPC ............ 152/209.11; 152/209.15; 152/209.17; 152/902; 152/DIG. 3

(58) Field of Classification Search
CPC .... B60C 11/032; B60C 11/11; B60C 2200/10
USPC .................. 152/209.11, 209.15, 209.17, 902, 152/DIG. 3
See application file for complete search history.

(56) References Cited

U.S. PATENT DOCUMENTS

| 952,039 | A | * | 3/1910 | Greenwald | .............. 152/209.17 |
| 3,631,911 | A | * | 1/1972 | Verdier | ......................... 152/210 |
| 2008/0283167 | A1 | * | 11/2008 | Matsumura | .............. 152/209.11 |

FOREIGN PATENT DOCUMENTS

| EP | 1 992 504 A1 | 11/2008 |
| GB | 2 005 200 A | 4/1979 |
| JP | 57-3846 Y2 | 1/1982 |

(Continued)

OTHER PUBLICATIONS

Machine translation for Japan 06-006005 U (no date).*

(Continued)

*Primary Examiner* — Steven D Maki
(74) *Attorney, Agent, or Firm* — Sughrue Mion, PLLC

(57) ABSTRACT

Disclosed is a pneumatic tire for motorcycle wherein edge effect can be achieved without changing the design of block pattern, and stability of steering such as grip, feeling of grounding, or controllability of slip is enhanced. When a block having a recess in which a protrusion is formed on the bottom is provided in a tread, edge component increases correspondingly as compared with a block provided only with a recess (having no protrusion), and thereby traction can be enhanced. Since it is not required to increase the hardness of rubber of the read nor to enlarge the block size, feeling of grounding is ensured and controllability of slip can be ensured in a muddy place or on a soft road surface.

3 Claims, 2 Drawing Sheets

(56) References Cited

FOREIGN PATENT DOCUMENTS

| | | | |
|---|---|---|---|
| JP | 60-110110 U | | 7/1985 |
| JP | 60-110110 U | * | 7/1985 |
| JP | 63-67304 U | | 5/1988 |
| JP | 01-273706 A | * | 11/1989 |
| JP | 3-239606 A | | 10/1991 |
| JP | 5-89009 U | | 12/1993 |
| JP | 6-6005 U | | 1/1994 |
| JP | 06-006005 U | * | 1/1994 |
| JP | 6-320916 A | | 11/1994 |
| JP | 3021694 B2 | * | 3/2000 |
| JP | 2008-279996 A | | 11/2008 |
| WO | 96/15002 A1 | | 5/1996 |

OTHER PUBLICATIONS

Machine translation for Japan 3,021,694 B2 (no date).*
Machine translation for Japan 01-273706 (no date).*
International Search Report dated Apr. 7, 2009 (4 pages).
Extended European Search Report issued in European Application No. 09713493.6 dated Mar. 6, 2012.

* cited by examiner

PNEUMATIC TIRE FOR MOTORCYCLE

TECHNICAL FIELD

The present invention relates to a pneumatic tire for a motorcycle that is mounted on a motorcycle and particularly relates a pneumatic tire for a motorcycle for motocross or enduro events where the purpose is travel on rough place including muddy ground.

BACKGROUND ART

Pneumatic tires for motorcycles that have a block pattern such as described in patent document 1, for example, are used in motorcycles that travel on rough place (e.g., see patent document 1).

In block pattern tires for rough place, in order to increase traction, it becomes necessary to increase the block rigidity for the purpose of obtaining the effect of digging into the road surface.

Conventionally, the blocks themselves have been made larger to increase the block rigidity or the hardness of the rubber that is used has been increased to increase the block rigidity.

Patent Document 1: JP-A No. 06-320916

DISCLOSURE OF THE INVENTION

Problem that the Invention is to Solve

When the blocks themselves are made larger to increase the block rigidity, there also becomes less movement of the block tread surface, so grip at the block tread surface cannot be ensured on hard road surfaces (it is difficult for the block tread surface to adapt to the road surface), and, as a result, measures to place slits or dispose recesses in the ground-contact surfaces of the blocks (adjustment of the rigidity of the block tread surface) have been made to insure grip and a grounded sensation. That is, a certain degree of flexibility becomes necessary in the block tread surface.

Reducing the hardness of the rubber is also one means for the purpose of improving grip at the block tread surface, but in that case, there is the problem of quicker edge wear even if there is improvement in steering stability resulting from the softness of the rubber.

Further, when the blocks themselves are made larger, there is the problem that the negative ratio of the tire decreases, so the block ground-contact pressure also decreases, and a sufficient initial sticking effect is no longer obtained on muddy ground or soft road surfaces.

On the other hand, when the hardness of the rubber is increased, sufficient grip at the block tread surface is no longer obtained on hard road surfaces just like when the blocks themselves are made larger. Further, on muddy ground and soft road surfaces where a sticking effect and an edge effect are obtained, effects have not been seen in regard to slip control because of the hardness of the rubber. In a tire where the negative ratio is large and the hardness of the rubber is high and which does not bend, the number of blocks effectively acting on the road surface also becomes fewer, and, as a result, slip control drops.

The present invention has been made in order to address the problems described above, and it is an object thereof to provide a pneumatic tire for a motorcycle that can realize an improvement in the edge effect without changing block pattern designs under current circumstances and can improve steering stability such as grip, a grounded sensation, and slip control.

Means for Solving the Problem

A pneumatic tire for a motorcycle according to a first aspect of the invention includes a tread which is provided with plural blocks in which recessed portions are formed that open to a tread surface side, wherein at least some of the plurality of the blocks in which the recessed portions are formed have protrusions that are formed at bottom portions of the recessed portions.

Next, the action of the pneumatic tire for a motorcycle according to the first aspect of the invention will be described. By forming the recessed portions that open to the tread surface side in the blocks of the tread, the edge effect is enhanced over blocks that do not have the recessed portions because of the edges of the open portions of the recessed portions. Moreover, by forming the protrusions in the insides of the bottom portions, the edge effect is enhanced over blocks that do not have the protrusions because of the edges of those protrusions. That is, by forming the recessed portions in the blocks and forming the protrusions inside those recessed portions, a significant improvement in the edge effect can be realized as compared to usual blocks that do not have the recessed portions and the protrusions.

As for the blocks in which the protrusions are disposed inside the recessed portions, the sites where they are placed and how many of them are placed may be decided depending on the required performance of the tire. Further, an improvement in steering stability over a wide range, from hard road surfaces to soft road surfaces including muddy ground, can be realized by controlling the height of the protrusions.

An invention according to a second aspect is the pneumatic tire for a motorcycle according to the first aspect of the invention, wherein the tread the tread includes a center portion block row comprising plural blocks that are disposed along a circumferential direction at a width direction center of the tread; a tread end-side block row comprising plural blocks that are disposed at tire width direction outer sides of the center portion block row and are disposed at tread end sides of the tread and along the circumferential direction; and a middle portion block row comprising plural blocks that are disposed between the center portion block row and the tread end-side block row and along the circumferential direction, wherein: the blocks configuring the center portion block row are provided with one or more of the recessed portions per block; the blocks configuring the middle portion block row and the blocks configuring the tread end-side block row are configured to have fewer of the recessed portions than the blocks configuring the center portion block row; and the blocks configuring the center portion block row and the blocks configuring the middle portion block row are provided with the recessed portions in which the protrusions are formed.

Next, the action of the pneumatic tire for a motorcycle according to the second aspect of the invention will be described. By disposing many of the recessed portions on the width direction center side of the tread where the ground contact pressure is high and placing the protrusions in those recessed portions like in the pneumatic tire for a motorcycle according to the second aspect of the invention, traction performance can be increased and steering stability can be improved.

An invention according to a third aspect is the pneumatic tire for a motorcycle according to the first aspect or the second aspect of the invention, wherein the blocks configuring the center portion block row are provided with one or two of the recessed portions in which the protrusions are formed; and the blocks configuring the middle portion block row are smaller in size than the blocks configuring the center portion block row and are provided with only one of the recessed portions in which the protrusions are formed.

Next, the action of the pneumatic tire for a motorcycle according to the third aspect of the invention will be described. In a pneumatic tire for a motorcycle that is provided with plural blocks in the tread, that is, in a pneumatic tire for a motorcycle that has a block pattern, blocks of a proper size are placed in each site of the tread because the block pattern has a basic design (securement of the performance of the block pattern).

Changing the size of the blocks is a difficult situation under such design constraints, so when the number of the recessed portions in which the protrusions are formed becomes three or more in the blocks configuring the center portion block row, the protrusions become too small and a sufficient edge effect is no longer obtained. Further, when the number of the recessed portions in which the protrusions are formed becomes two or more in the blocks configuring the middle portion block row and which are formed smaller than the blocks configuring the center portion block row, the protrusions become too small and a sufficient edge effect is no longer obtained. The blocks configuring the middle portion block row becomes used more frequently when traveling with the motorcycle tilted. When the blocks configuring the middle portion block row are large like the blocks configuring the center portion block row, it becomes difficult for the blocks configuring the middle portion block row to adapt to hard road surfaces, and there is the fear that it will become difficult to ensure sufficient steering stability. For this reason, it is preferable to make the blocks configuring the middle portion block row smaller in size than the blocks configuring the center portion block row.

An invention according to a fourth aspect is the pneumatic tire for a motorcycle according to any one of the first aspect to the third aspect of the invention, wherein when a represents the depth of the recessed portions measured from the tread surface and b represents the height of the protrusions measured from the bottom portions of the recessed portions, the pneumatic tire satisfies the following relationship:

$a-b=-2$ to $+2$ mm.

Next, the action of the pneumatic tire for a motorcycle according to the fourth aspect of the invention will be described.

When the value of a−b becomes larger on the positive side than +2 mm (when the protrusions become lower than the block tread surface), the wear on the blocks themselves (the portions excluding the protrusions) becomes larger and sufficient steering stability cannot be ensured until the edges of the protrusions contact the road surface.

On the other hand, when the value of a−b becomes larger on the minus side than −2 mm (when the protrusions project more than 2 mm from the block tread surface), the protrusions themselves inside the blocks act as single blocks, and the blocks serving as the foundation cannot be effectively used, which leads to a drop in steering stability resulting from insufficient rigidity and insufficient ground contact area.

Advantageous Effects of the Invention

As described above, the pneumatic tire for a motorcycle according to the first aspect of the invention is given the configuration described above, so it has the excellent effect that it can increase the edge effect without changing block pattern designs under current circumstances and can improve steering stability such as grip, a grounded sensation, and slip control.

BEST MODES FOR CARRYING OUT THE INVENTION

A pneumatic tire 10 for a motorcycle pertaining to an embodiment of the present invention will be described in accordance with the drawings.

Figure 1:
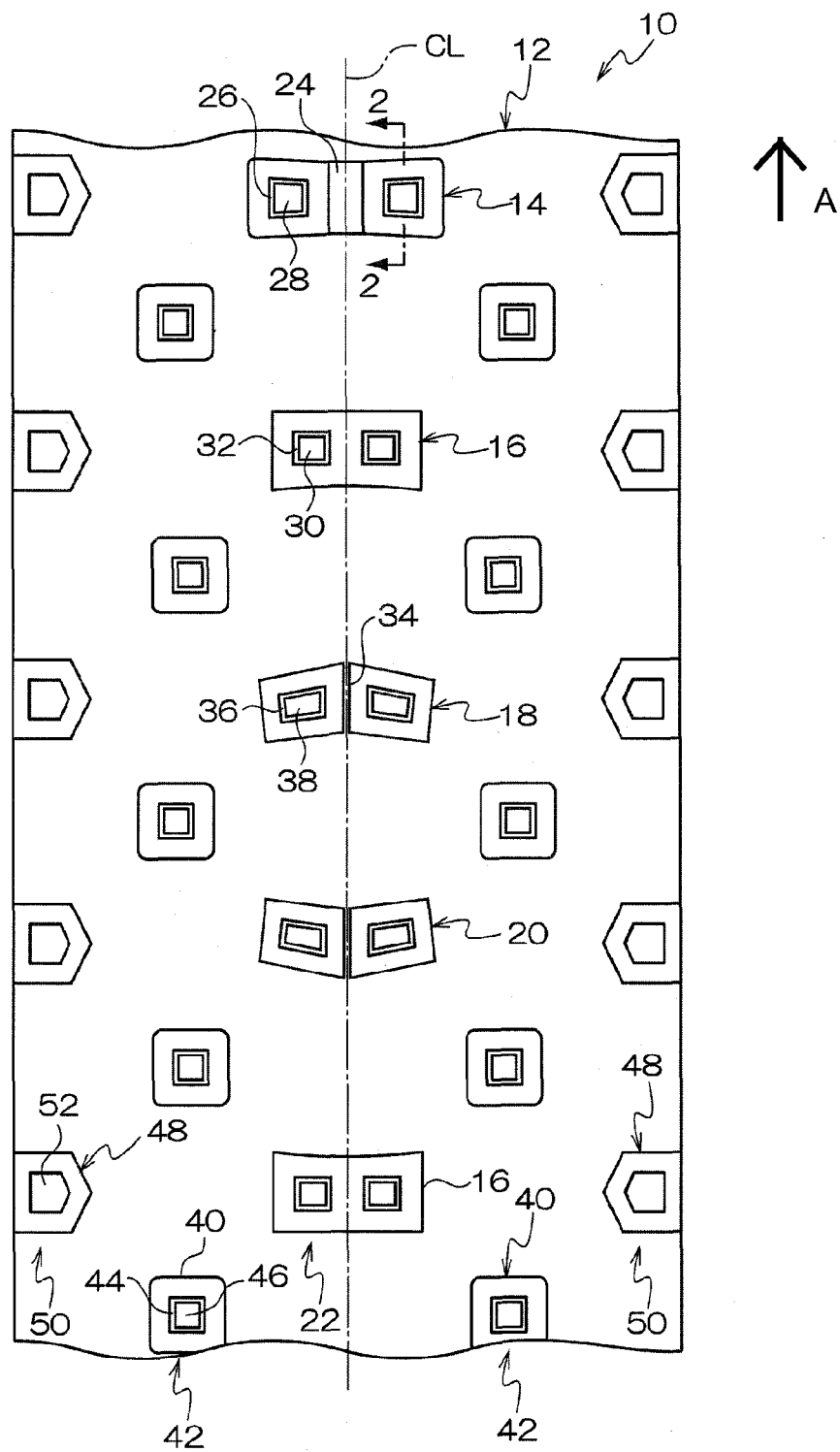
FIG. 1 is a developed view of a tread of a pneumatic tire for a motorcycle pertaining to a first embodiment.

FIG. 1 is a plan view where a tread 12 of the pneumatic tire 10 for a motorcycle of the present embodiment is planarly developed and seen.

As shown in FIG. 1, a first center block 14, a second center block 16, a third center block 18, and a fourth center block 20 are placed an interval apart from each other in a tire circumferential direction (the direction of arrow A (a tire rotation direction) and the opposite direction of the direction of arrow A) on a tire equatorial plane CL of the tread 12 to form a center portion block row 22.

(Center Portion Block Row)

The first center block 14 has a rectangular shape that is long in a tire width direction, and a relatively wide shallow groove 24 that extends in the tire circumferential direction is formed in the width direction center portion of the first center block 14. The depth dimension of the shallow groove 24 is smaller than the height dimension of the first center block 14.

In the first center block 14, recessed portions 26 that are square when the tread is seen in a plan view are formed on both sides of the shallow groove 24, and on the bottom portions of the recessed portions 26, protrusions 28 that are square when the tread is seen in a plan view are formed.

Between the side walls of the recessed portions 26 and the side walls of the protrusions 28, there are formed narrow groove-like clearances, and these clearances are set to a dimension where they do not disappear even when the first center block 14 contacts the road surface, that is, a dimension where the side walls of the recessed portions 26 and the side walls of the protrusions 28 do not contact each other.

Figure 2:
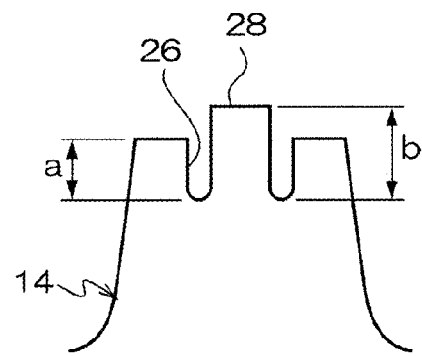
FIG. 2 is a longitudinal sectional view of a block (a cross-sectional view taking along line 2-2 in FIG. 1)

As shown in the cross-sectional view of FIG. 2, when a represents the depth of the recessed portions 26 measured from the block tread surface and b represents the height of the protrusions 28 measured from the bottom portions of the recessed portions 26, it is preferable to set the depth a of the recessed portions 26 and the height b of the protrusions 28 such that they satisfy a−b=−2 to +2 mm.

The top portions (tread surface) of the protrusions 28 of the present embodiment are formed parallel to the tread surface of the first center block 14.

As shown in FIG. 1, the second center block 16 has, like the first center block 14, a rectangular shape that is long in the tire width direction, and recessed portions 32 formed with protrusions 30 that are the same as those of the first center block 14 are formed on both sides of the tire width direction center portion of the second center block 16.

The third center block 18 has a generally rectangular shape that is long in the tire width direction, and a relatively narrow shallow groove 34 that extends in the tire circumferential direction is formed in the width direction center portion of the third center block 18. The depth dimension of the shallow groove 34 is smaller than the height dimension of the third center block 18. In this third center block 18 also, recessed portions 38 formed with protrusions 36 are formed on both sides of the shallow groove 34.

The fourth center block 20 has the same shape as the third center block 18 but is formed such that the orientation of the block is the opposite orientation.

(Middle Portion Block Rows)

On both sides in the tire width direction of the center portion blow row 22, plural middle portion blocks 40 are placed an interval apart from each other in the tire circumferential direction to form a middle portion block row 42.

The middle portion blocks 40 are former smaller than the blocks in the center portion block row 22 and have square shapes when the tread is seen in a plan view, with recessed portions 44 that are square when the tread is seen in a plan view being formed in the center portions of the middle portion blocks 40 and with one protrusion 46 that is square when the tread is seen in a plan view being formed on the bottom portions of the recessed portions 44.

(Tread End-Side Block Rows)

On the tire width direction outer sides of the middle portion block rows 42, plural tread end-side blocks 48 are placed an interval apart from each other in the tire circumferential direction to form tread end-side block rows 50.

The tread end-side blocks 48 have pentagonal shapes when the tread is seen in a plan view, and one recessed portion 52 that is pentagonal when the tread is seen in a plan view is formed in the centers of the tread end-side blocks 48.

It is preferable for the depth a of each recessed portion and the height b of each protrusion in the second center block 16, the third center block 18, the fourth center block 20, and the middle portion blocks 40 to be set in the same manner as those in the first center block 14.

It is preferable for the blocks configuring the center portion block row 22 to be formed with one or more recessed portions per block like in the present embodiment.

It is preferable for the blocks configuring the middle portion block rows 42 and the blocks configuring the tread end-side block rows 50 to be set such that they have a fewer number of the recessed portions than the blocks configuring the center portion block row 22 like in the present embodiment.

Further, it is preferable for the blocks configuring the center portion block row 22 and the blocks configuring the middle portion block rows 42 to be disposed with the recessed portions in which the protrusions are formed like in the present embodiment.

(Action)

In the pneumatic tire 10 for a motorcycle of the present embodiment, the recessed portions that open to the tread surface side are formed in the first center block 14, the second center block 16, the third center block 18, and the fourth center block 20 configuring the center portion blow row 22 and in the middle portion blocks 40 configuring the middle portion block row 42, and the protrusions are formed on the bottom portions of these recessed portions, so that the edge component corresponding to the protrusions increases in comparison to blocks disposed with only the recessed portions (not having the protrusions), whereby traction can be improved.

In the pneumatic tire 10 for a motorcycle of the present embodiment, it is not necessary to reduce the hardness of the rubber for the purpose of improving grip at the block tread surface, and thus the problem of quicker edge wear does not arise.

Here, when the blocks themselves are made larger, the negative ratio of the tire also decreases, so that the block ground-contact pressure also decreases, and a sufficient initial sticking effect is no longer obtained on muddy ground or soft road surfaces, but in the pneumatic tire 10 for a motorcycle of the present embodiment, it is not necessary to make the blocks themselves larger as compared to conventionally, and thus a sufficient initial sticking effect is obtained on muddy ground and soft road surfaces.

Further, when the hardness of the rubber of the tread is increased, sufficient grip at the block tread surface is not obtained on a hard road surface, and on muddy ground and soft road surfaces where a sticking effect and an edge effect are obtained, slip control is difficult because of the hardness of the rubber, but in the pneumatic tire 10 for a motorcycle of the present embodiment, it is not necessary to increase the hardness of the rubber as compared to conventionally, and thus slip control on muddy ground and soft road surfaces can be ensured.

In this manner, according to the pneumatic tire 10 for a motorcycle of the present embodiment, with a simple configuration in which recessed portions provided with protrusions are disposed in the blocks, the edge effect can be increased without changing the block pattern design, and steering stability such as grip, grounding sensation, and slip control can be improved.

According to the pneumatic tire 10 for a motorcycle of the present embodiment, an improvement in steering stability over a wide range, from hard road surfaces to soft road surfaces including muddy ground, can be realized by controlling the height of the protrusions. When the value of a−b, which is the difference between the depth a of the recessed portions measured from the tread surface and the height b of the protrusions measured from the bottom portions of the recessed portions, becomes larger on the positive side than +2 mm, the wear on the blocks themselves (the portions excluding the protrusions) becomes larger and sufficient steering stability cannot be ensured until the edges of the protrusions contact the road surface.

On the other hand, when the value of a−b becomes larger on the negative side than −2 mm, the protrusions themselves inside the blocks act as single blocks, and the blocks serving as the foundation cannot be effectively used, which leads to a drop in steering stability resulting from insufficient rigidity and insufficient ground contact area.

Other Embodiments

In the embodiment described above, the protrusions are not formed in the recessed portions 52 of the tread end-side blocks 48 configuring the tread end-side block rows 50, but the protrusions may also be formed therein.

The blocks in which the recessed portions disposed with protrusions are formed are not limited to the placement in the embodiment described above, and various changes in the placement are possible as long as they do not depart from the gist of the present invention.

In the embodiment described above, two of the recessed portions are formed in each of the blocks in the center portion block row 22, but the number of the recessed portions may also be one.

Figure 3:
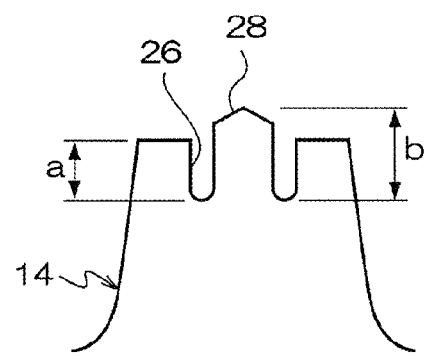
FIG. 3 is a longitudinal sectional view of a block pertaining to another embodiment.
Figure 4:
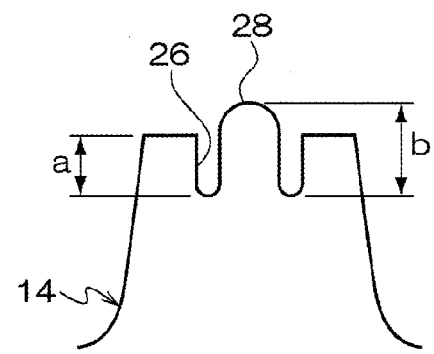
FIG. 4 is a longitudinal sectional view of a block pertaining to still another embodiment.

In the embodiment described above, the cross-sectional shape of the protrusions is formed as shown in FIG. 2, and the top portions (tread surface) of the protrusions are formed parallel to the tread surface of the blocks, but the present invention is not limited to this; the cross-sectional shape of the top portions of the protrusions may also be triangular as shown in FIG. 3 or have a circular arc shape as shown in FIG. 4.

Test Examples

In order to verify the effects of the present invention, four types of conventional tires and four types of tires of the embodiment to which the present invention is applied were prepared, the test tires were mounted on an actual vehicle, and actual vehicle evaluations resulting from travel on rough place were performed by a professional rider.
- Conventional tires: tires provided with blocks having only the recessed portions.
- Embodiment tires: tires provided with blocks having the protrusions inside the recessed portions.

The conventional tires and the embodiment tires both had the same patterns.
- Negative percentage of tread: 80%
- Block height: front=12.5 mm, rear=15.5 mm
- Block cross-sectional shape: see FIG. 2; a=1.5 mm, b=2.5 mm.
- Tire size cross section nominal: front=80/100, rear=120/80
- Tire inch diameter: front=21 inches, rear=19 inches
- Rim for actual vehicle test: front=1.60×21, rear=2.15×19
- Internal pressure used in actual vehicle test: 80 kPa The eight types of tires were created as in Table 1 below.

TABLE 1

|  | Front (Bias Structure) | Front (Radial Structure) | Rear (Bias Structure) | Rear (Radial Structure) |
|---|---|---|---|---|
| Conventional | Test Type (1) | Test Type (3) | Test Type (5) | Test Type (7) |
| Embodiment | Test Type (2) | Test Type (4) | Test Type (6) | Test Type (8) |

Bias structure: two carcass plies including nylon cord were used. The angle of the nylon cord was 30° with respect to the tire circumferential direction. Further, one reinforcement layer (a so-called nylon cap) including nylon cord was disposed on the outer peripheral side of the carcass.
Radial structure: one carcass ply including nylon cord was used. A mono-spiral belt of aromatic polyamide cord (so-called Kevlar (trademark name) cord) was disposed on the outer peripheral side of the carcass.

The evaluations of each of the tires are shown in Table 2 below. The evaluations are sensation evaluations (on a scale of 1 to 10) given by the professional rider, and the higher the numerical values are, the better the performance.

TABLE 2

|  | Grip sensation | Grounded sensation | Rigidity sensation | Slip Control |
|---|---|---|---|---|
| Test Type (1) | 5 | 5 | 5 | 5 |
| Test Type (2) | 7 | 8 | 7 | 8 |
| Test Type (3) | 6 | 7 | 6 | 7 |
| Test Type (4) | 8 | 9 | 7 | 9 |
| Test Type (5) | 5 | 5 | 5 | 5 |
| Test Type (6) | 7 | 8 | 7 | 7 |
| Test Type (7) | 6 | 6 | 6 | 7 |
| Test Type (8) | 8 | 9 | 8 | 8 |

As a result of the tests, it is understood that the tires of the embodiment to which the present invention is applied were better than the conventional tires in all items of grip sensation, grounded sensation, rigidity sensation, and slip control regardless of front and rear and regardless of the internal structure of the tires.

The invention claimed is:

1. A pneumatic tire for a motorcycle comprising a tread comprising:
   a center portion block row comprising a plurality of blocks that are disposed along a circumferential direction at a width direction center of the tread;
   at each tread end side of the tread at the tire width direction outer side of the center portion block row, a tread end-side block row comprising a plurality blocks that are disposed along the circumferential direction; and
   a middle portion block row comprising a plurality blocks that are disposed between the center portion block row and each tread end-side block row and along the circumferential direction, wherein:
   each of the blocks in the center portion block row is provided with at least one recessed portion in which a protrusion protruding from the center block is formed on the bottom portion of the recessed portion of the center block, each block in the middle portion block rows is provided with a recessed portion in which a protrusion protruding from the middle block is formed on the bottom portion of the recessed portion of the middle block, and each block in the tread end side block rows is provided with a recessed portion,
   the total number of the recessed portions provided at the blocks configuring each middle portion block row is configured to be fewer than the total number of the recessed portions provided at the blocks configuring the center portion block row and the total number of the recessed portions provided at the blocks configuring each tread end-side block row is configured to be fewer than the total number of the recessed portions provided at the blocks configuring the center portion block row; and
   wherein in each block of the center portion block row, the tread surface of the protrusion is formed parallel to the tread surface of the center block,
   wherein narrow groove-like clearances formed between side walls of the recessed portions and side walls of the protrusions in the center blocks and the middle blocks are configured to have a dimension in which the side walls of the recessed portions and the side walls of the protrusions do not contact each other even when the blocks contact a road surface, and
   wherein each of the blocks of the center portion block row comprises at least two recessed portions respectively.

2. The pneumatic tire for a motorcycle according to claim 1, wherein
   the blocks configuring the middle portion block row are smaller in size than the blocks configuring the center portion block row and are provided with only one of the recessed portions in which the protrusions are formed.

3. The pneumatic tire for a motorcycle according to claim 1, wherein when a represents the depth of the recessed portions measured from the tread surface and b represents the height of the protrusions measured from the bottom portions of the recessed portions, the pneumatic tire satisfies the following relationship:

$$0 \text{ mm} < b-a < 2 \text{ mm}.$$

* * * * *